Nov. 24, 1964  L. HELLER ETAL  3,158,666
HEAVY-DUTY MIXING CONDENSER
Filed Sept. 11, 1961  3 Sheets-Sheet 3

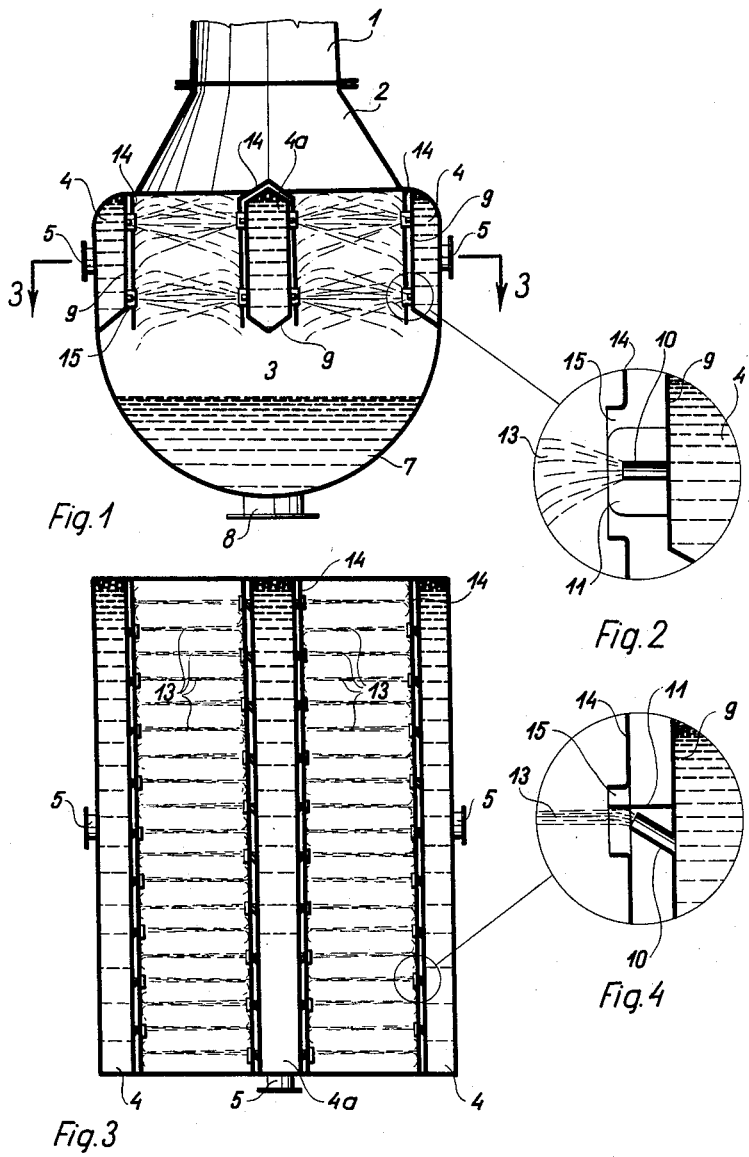

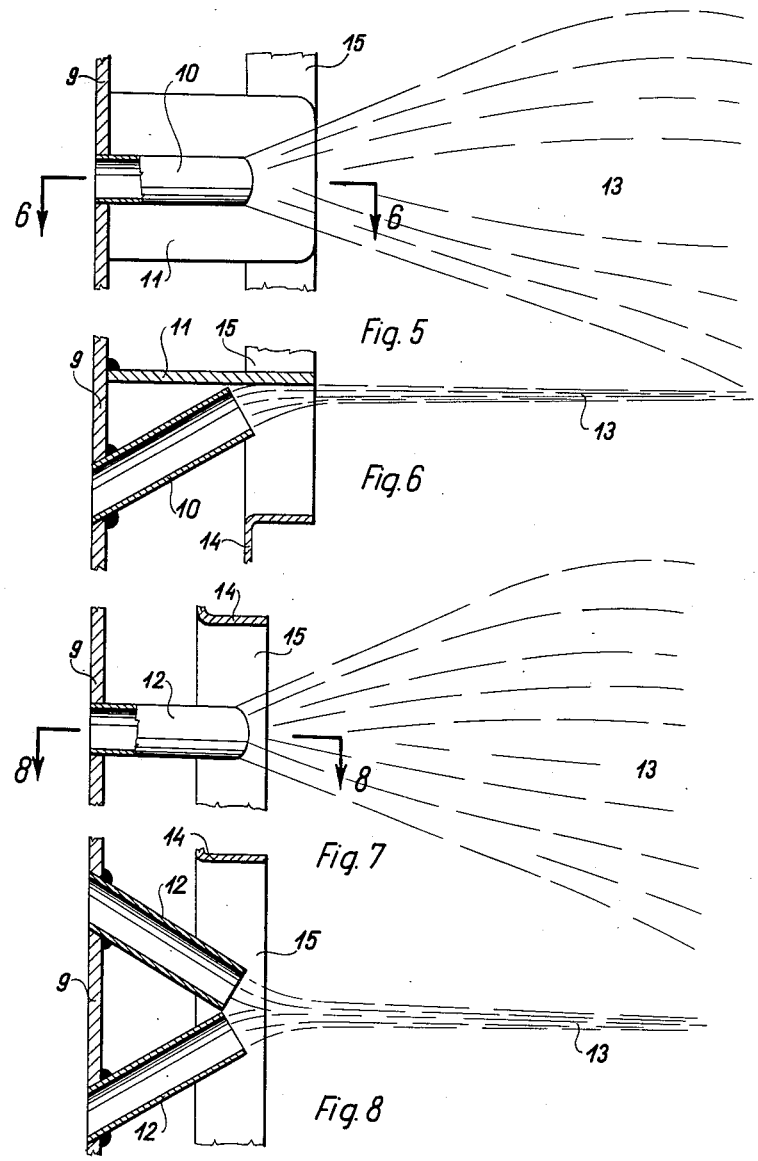

INVENTORS
LASZLO HELLER
LASZLO FORGO
BY ARPAD BAKAY

Blum, Moscovitz,
Friedman and Blum
Attorneys

United States Patent Office 3,158,666
Patented Nov. 24, 1964

3,158,666
HEAVY-DUTY MIXING CONDENSER
Laszlo Heller, Laszlo Forgo, and Arpad Bakay, all of Budapest, Hungary, assignors to Licencia Talalmanyokat Ertekesito Vallalat, Budapest, Hungary
Filed Sept. 11, 1961, Ser. No. 138,223
4 Claims. (Cl. 261—118)

This invention relates to a heavy-duty mixing condenser.

Mixing condensers have been developed simultaneously with the steam engine. They serve the purpose of condensing the low power exhaust steam issuing from a steam engine or turbine under vacuum. Owing to the elimination of the steam engine from the field of power generation, and furthermore in consequence of the quality of the feed water requirements in connection with modern boilers, which feed water must be prevented from mixing with the cooling water so as to prevent a contamination of the condensate, mixing condensers have been steadily losing ground. At the present time mixing condensers are used to an appreciable extent only in conjunction with chemical apparatus, particularly evaporation plants.

As is well known, so-called air condensation equipment has recently been employed for the condensation of exhaust issuing from steam turbines. In the case of such equipment, the steam is taken from a turbine, upon escaping, and is condensed in a mixing condenser whereupon the mixture produced in the mixing condenser is cooled by cooling water. The cooling water, which has thereby been heated, is again cooled in a large heat exchanger by means of outside air, and is re-routed into the mixing condenser, for the purpose of repeated use for condensation. The water necessary for the feeding of the boiler is likewise taken from this mixture of cooling water and condensation water. Since, in this instance, the condensate employed as cooling water is of the quality of feed water, the fed water will not suffed deterioration in quality by being mixed with the cooling water.

Air condensation equipment of this type is also used in connection with heavy-duty steam turbines, so that the design of air condensation equipment suitable for use in conjunction with heavy-duty turbines has become an imperative need.

The types of designs of mixing condensers known up to now are not suited for use in connection with heavy-duty steam turbines for a number of reasons. They can be classified in a number of categories.

One of the most widespread categories embraces the plate condensers, in which tandem fitted plates are provided along the path of the flowing steam, whereby the cold cooling water is supplied at the upper plates, propagating with the steam in direct or counter current. The space requirement for mixing condensers of this type is very high, in addition to which it also requires a high flow resistance in view of the rates of flow of the steam in modern condensers.

Another familiar type of mixing condenser is represented by the Weringhouse-Leblanc system, in which mixing nozzles are employed. The cooling water, which flows at a relatively high velocity, and the steam which is to be condensed are forced by the nozzles into a mixing chamber. This type of condenser is suited for the condensation of appreciably higher quantities of steam than the plate condensers, but it still requires a much larger space than is desirable.

Familiar to the art, also are mixing condensers which operate by means of nozzles. The cooling water is here supplied by means of nozzles under a suitable pressure, the said nozzles blowing the water apart into minute drops, thereby increasing greatly the water surface which comes into contact with steam and producing an intimate mixture of steam and cooling water, with a subsequent rapid heating of the cooling water. In this type of condensation, it is generally required to have a high cooling water pressure, to assure a proper atomization of the water, and this in turn makes it necessary to have a high expenditure of power for the cooling water circulatory pump. In the case of a heavy-duty plant, this is apt to necessitate dimensions of a type that render the plant uneconomical.

In the case of mixing condensers which operate by spray, there is another problem. For the purpose of satisfactory heat transfer, it is necessary to produce water drops of comparatively low dimensions; but this is possible only at high velocities. As a result, either the duration of time during which the water drops remain in the condenser is reduced to such an extent that the drops cannot be heated as required, or the volume of the condensers must be enlarged to make certain that the water drops will stay a sufficiently long time in the condenser.

In recent experiments, it has been found that the predominant portion of the heat exchange, in the case of nozzles mounted in the steam chamber, takes place in the film phase which precedes the phase wherein the water is broken down into drops. Accordingly, the atomization of the cooling water into drops is not required from the standpoint of heat transfer; and the nozzles could be used in such a manner as to bring about the occurrence of the film phase only. However, if the nozzle emits water in a conical pattern, the bursting of the film into drops cannot be prevented, inasmuch as without the explosion of the cohesive, conical film, the steam to be condensed cannot be brought into contact with the film on both sides, so as to bring about a heat exchange between the steam and the water which is still in the film phase. For this reason, the use of nozzles to supply water in a conical pattern has two drawbacks. On the one hand, an excessively high pressure must be employed for the purpose of atomization, and on the other hand, atomization (spray formation) assures in the main only the ability to supply the steam, without the atomized droplets taking part to an appreciable degree in the exchange of heat. The inefficient exploitation of the condenser space is thus due to the fact that the conical spray form, as such, is unsatisfacotry; and the supply of the steam cannot be achieved without the otherwise excessively atomized particles.

In summary, the known mixing condensers, as above-described, are unsatisfactory for use in connection with modern heavy-duty steam turbines. An important object of the invention is the development of an improved mixing condenser which obviates the aforesaid difficulties and which is suitable from the standpoint of design for use with heavy-duty steam turbines.

The essential feature of the invention resides in a novel manner of supplying the cooling water, which is supplied in the form of vertical water film surfaces, with intensive, inner eddies (turbulence). The invention is predicated on the theoretical and experimental investigation of heat exchange of water film surfaces, and rests on the knowledge that vertical water film surfaces must exhibit an intensive eddy or turbulence, in order to reach the temperature of the steam chamber over a comparatively short stay. Given a laminar structure of the water film, the quantity of heat transferred at the surface is able to permeate only by heat conduction in the water film, and this does not afford a corresponding heating of the water film, in view of the slight heat transfer coefficient of the water. For this reason, care must be exercised that the flow of heat inside the water film is improved, and this can be attained only by a strong inner turbulence in the water film. Pursuant to the invention, water film surfaces are produced, which exhibit strong inner eddies (turbulence) by the very circumstances under which they are produced. In the case of these water film surfaces, the heat is able to penetrate very rapidly from the surface of the water film to the inside of same, thus assuring that the water film will absorb the temperature of the steam chamber correspondingly rapidly.

The said water film surfaces exhibit a number of advantages over the types of water feeding employed hitherto.

Owing to the means by which they are produced, the water film surfaces pursuant to the invention exhibit a very high turbulence, thereby giving rise to very favorable heat transfer relations. The form of the water film surface makes it possible for it to assume a position in the direction of the flow of the steam, whereby it offers a minimum resistance. The condensation space is properly utilized, owing to the flat form of the water film surfaces.

In one embodiment of the invention, the production of water film surfaces is accomplished by resort to cooling water which is forced through tubes of comparatively small diameter, ranging from 8 to 40 mm., with impact surfaces inclined at an oblique angle with the axis of the pipe, located outside the outlet ends of the said tubes. The water jet issuing from the tube strikes the impact surface and undergoes a substantial deflection of direction, whereby a large oval water film surface with heavy inner turbulence is produced, said film exploding into a small number of drops along the edges.

In another embodiment of the invention, a similar water film surface is achieved by resort to two water jets which collide with each other at a flat angle. The water film surface produced by the collision of the two water jets also exhibits a very high inner turbulence, so that the heat exchange relations in this instance are also of a very favorable kind.

Owing to the fact that the nozzles do not atomize the water, or in other words, do not cause the bursting of the water jet into very minute drops, they require a lower energy than the common type of nozzle for the formation of water film surfaces. Data and experiments have shown that the loss of pressure (loss gradient) of the water flowing through the nozzle in accordance with the invention, for the purpose of forming water film surfaces, represents only a fraction of the loss pressure when the commonly employed nozzles are used.

In addition to the favorable conditions of heat exchange described in the foregoing, the water film surfaces are also advantageous from the standpoint of the design of the mixing condensers. As is well known, the various accessories used hitherto for the purpose of enlarging the water surface produce a considerable flow resistance. On the other hand, pursuant to the invention, the water film surfaces can be so arranged in the condenser, that their planes run parallel, or nearly parallel to the direction of flow of the steam, as a consequence of which the said surfaces offer only a slight resistance to the steam flow, and make possible maximum utilization of the condenser space. In the case of water film surfaces of this type, the conical dead spaces generally occurring in the case of conventional diffusers are eliminated, and the improved water diffuser or nozzle makes it possible for the steam to be in contact with both sides of the water film surface.

To sum up, the mixing condenser apparatus pursuant to the invention differs from the familiar types of mixing condensers, in that with the use of relatively low inlet water pressure, one obtains water film surfaces with a high heat transfer coefficient which interfere with the flow of steam to only a slight extent, while utilizing the condenser space to the best advantage. Accordingly, the dimensions of the mixing condenser are greatly reduced, whereby the production costs of the condenser are, of course, greatly reduced. Also, the part of the building wherein the condensers are installed may be correspondingly reduced in dimensions, whereby large savings are made possible in the construction of power plants. Furthermore, the smaller dimensions of the mixing condensers are responsible for the fact that it is no longer necessary to mount steam turbines on very elevated substructures (5 to 10 meters, and even higher in the case of heavy-duty units), whereby the disturbing vibrational effects of said substructures are also eliminated.

In the drawings:

FIGS. 1–4, show a first embodiment of the invention. FIG. 1 is a vertical section of a steam condenser incorporating improved water feeding means in accordance with this invention. FIG. 1 is drawn diagrammatically, as a result of which shading and cross-hatching are omitted, since the purpose of the view is to show the overall arrangement of parts and also other general relationship of water films (shown schematically) produced in the condenser chamber.

FIG. 2 is a diagrammatic view, to enlarged scale, similar to FIG. 1, of the invention, showing a detail thereof. For convenience, the portion of FIG. 1 reproduced in FIG. 2 is circled in both views.

FIG. 3 is a cross-section on line 3—3 of FIG. 1 also drawn diagrammatically with omission of shading and cross-hatching, and with the water films shown schematically.

FIG. 4 is a diagrammatic view, to enlarged scale, similar to FIG. 3, of the invention, showing a detail thereof. For convenience, the portion of FIG. 3 reproduced in FIG. 4 is circled in both views.

FIG. 5 is a section fragmentary detail view similar to FIG. 2, but drawn to still more greatly enlarged scale. FIG. 5 is slightly modified from FIG. 2.

FIG. 6 is a section on line 6—6 of FIG. 5.

FIGS. 7 and 8 show a second embodiment of the water feeding means. FIG. 7 is a sectional fragmentary detail view similar to FIG. 5.

FIG. 8 is a section on line 8—8 of FIG. 7.

FIG. 9 is a vertical section of the condenser.

FIG. 10 is a section on line 10—10 of FIG. 9.

FIGS. 1–6

Figure 9:
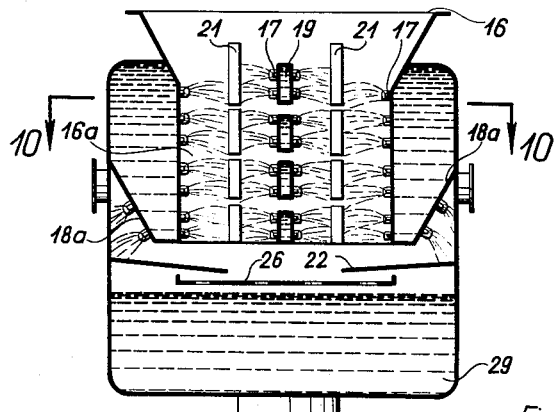
FIGS. 9 and 10 show diagrammatically another embodiment of the condenser chamber, in which the water feeding means of either FIGS. 1–6 or FIGS. 7–8 may be used.

FIGS. 1 and 2 show a vertically and longitudinally extending pipe 1, which may be the exhaust pipe of a steam turbine (not shown). A downwardly outwardly flared extension 2 is fixed to the lower end of exhaust pipe 1, by any suitable means, and in turn communicates at its lower end with the upper end of mixing condenser 3. The upper portion of the casing of condenser 3 is generally rectangular in cross section, but the lower portion of the casing of condenser 3 may be of reduced diameter and curved as shown in FIG. 1, to provide a sump 7. Sump 7 has a bottom outlet pipe 8.

In the upper portion of condenser 3, a series of three water distribution chambers 4 and 4a are provided. There are two such water distribution chambers 4 extending along parallel sides of mixing condenser 3 and extending between the front and rear of mixing condenser 3. The central water distribution chamber 4a also extends between the front and rear of mixing condenser 3 and is parallel to and equally spaced from the side water distribution chambers 4. The distribution chambers 4 and 4a are closed by walls on their four sides. A hollow inlet fitting 5 extends from outside the mixing condenser, through the wall thereof, into each of the respective distribution chambers 4 and 4a. Each of the fittings 5 is adapted to be connected to a source of water under suitable pressure (not shown).

Preferably, in accordance with the invention, spacing walls 14 are provided for each of the water distribution chambers 4 and 4a. The two chambers 4 have respective inner walls 9 which extend vertically and in the front to rear direction. Similarly, the central water distribution chamber 4a has outer side walls which are parallel to walls 9. A wall 14 is located spaced from and parallel to each wall 9 and each of the opposing parallel walls of chamber 4a.

A plurality of plates 11 extends laterally and vertically inwardly from walls 9 and outwardly from the opposing walls of chamber 4a, and extend through and beyond the respective adjacent walls 14, as shown in FIGS. 5 and 6. Plate 11 is secured to chamber wall 9 by any suitable means.

Associated with each plate 11 is a water feeding tube 10. Said tube 10 is fixed to chamber wall 9 at a point longitudinally spaced from and longitudinally opposing plate 11, as shown in FIGS. 5 and 6. Said tube 10 extends through an opening in wall 14 and is fixed to wall 9 by any suitable means. Said tube 10 converges from wall 9 toward plate 11 and extends through a corresponding opening in wall 14. The outlet end of tube 10 is located adjacent to plate 11. The axis of tube 10 makes an oblique angle with the plane of plate 11. The diameter of tube 10 is much less than the height of plate 11. Plate 11 extends beyond the outlet end of tube 10, as shown in FIGS. 5 and 6.

Optionally, as shown in FIGS. 1–4, instead of tube 14 extending through an opening of wall 14, an enlarged wall opening is provided, having a peripheral flange 15 extending in the direction away from the associated chamber wall 9. This is clearly shown in FIGS. 2 and 4. Plate 11 extends between the top and bottom portions of flange 15 and extends to the free edge thereof. Plate 11 and tube 10 extend between the other two opposed portions of flange 15.

The diameter of tube 10 and the angle which it makes with plate 11, together with the water pressure, are such that when the jet of water from tube 10 strikes plate 11, it spreads out and flattens to form what is essentially a film of water, clearly shown in FIGS. 5 and 6, and designated by the reference numeral 13. Said film 13 extends substantially in the direction of plate 11, and tends to have a somewhat oval shape adjacent tube 10. In the somewhat reduced scale of FIGS. 1 and 2, this oval shape is not generally apparent; and for convenience in FIGS. 1 and 2, the film 13 is shown as having relatively straight diverging upper and lower edges. FIG. 1 shows the general overall shape of each water film 13, the lower edge tending to diverge downwardly, and the upper edge being convex. Preferably, a cohesive water film is built up, steadily replenished by additional water from tube 10, the water film striking the wall 14 opposite the tube from which it is emitted, as shown in FIGS. 1 and 3. As shown highly diagrammatically in FIG. 3 when the water film strikes the wall 14 it tends to be deflected out of the plane of the main film, and the water striking wall 14 drops downwardly into sump 7.

Preferably, the tubes 10 are arranged in rows and columns on each wall 9. Illustratively, there are two rows of tubes 10 on each wall 9, and a plurality of columns as shown in FIG. 3. Preferably, as shown in FIG. 3, the columns of tubes 10 of each pair are offset with respect to each other so as to provide a maximum number of sheets 13 parallel to one another which extend across the condenser parallel to the direction of the steam flow.

As the result of this construction, a minimum impedance is afforded against the flow of steam through the condenser, while at the same time providing a maximum of water film surface in contact with the steam, such water film surface having a high degree of inner turbulence so as to insure maximum heat transfer from the steam to the water.

As a result of the position of the walls 14, the water emitted from each tube 10 is prevented from striking the cold chamber wall 9 opposite, and instead strikes the heated wall 14. This prevents the water, which has been heated, as a result of heat exchange with the steam, from being cooled down, which would exercise an adverse effect on the functioning of the condenser. It is also possible to exhaust air from the space between wall 14 and the chamber wall 9, by any suitable apparatus (not shown).

FIGS. 7 and 8

These views show a modified water feeding means. Tube 12 is secured to wall 9 and extends through an opening in wall 14, similarly to tube 10 in the first embodiment. However, instead of utilizing plate 11, a second tube 12 is secured to wall 9, and also extending through and protruding beyond an opening of wall 14. The two tubes 12 optionally and preferably have their axes located in a common horizontal plane, with their axes making the same acute angle with a vertical center plane. In other words, said tubes 12 converge symmetrically toward each other, and abut each other at their outlets. The water streams emitted from tubes 12 strike each other and then form a film surface 13 which is similar to the film surface 13 of the first embodiment.

Figure 10:
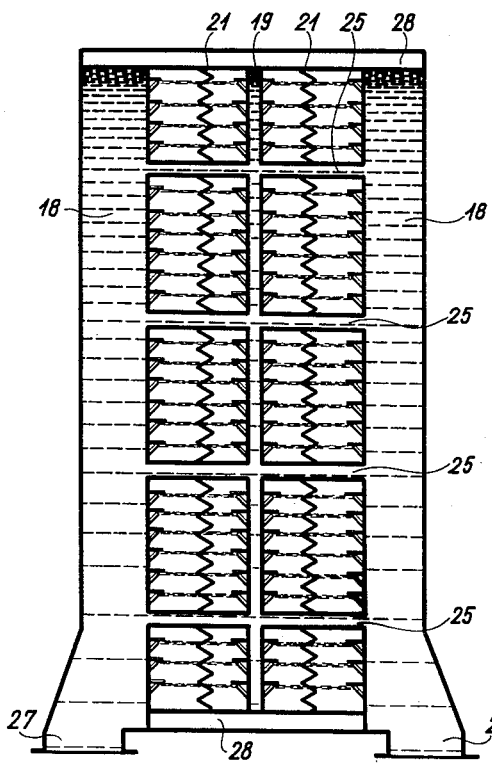

FIGS. 9 and 10

These views show another arrangement of the mixing condenser, particularly suitable for high output. Either the water feed means of FIGS. 1–6 or the water feed means of FIGS. 7–8 may be employed.

The mixing condenser 16a receives steam at its upper end from fitting 16, which may be connected to the exhaust of a steam turbine in the usual manner. Along each side of the casing, condenser 16a has a water reservoir 18. A plurality of spaced conduits 25 extend inwardly of and in communication with water chambers 18, in paired opposed relationship, as shown in FIG. 10. A plurality of thin, vertically and horizontally extending water conduits 19 are disposed halfway between the facing lateral walls of chambers 18, equi-distant therefrom and in parallel relationship thereto, said conduits 19 being vertically spaced. Each said conduit 19 extends the full length of the water chambers 18. Each said pair of conduits 25 connects at their inner ends with a conduit 19. Although not shown, it will be apparent that the conduits 25 are disposed in vertically spaced array, so as to provide entrance conduits 25 for each of the vertically spaced conduits. Each said water chamber 18 has an inlet 27, through which water may be forced, and it will be apparent that such water also enters the distribution conduit 19.

Water feed means 17, which have been described in detail in connection with the description of FIGS. 1–8, are respectively mounted upon the facing lateral walls of chambers 18, and upon the lateral walls of the various conduits 19, in any suitable pattern such as that shown in FIGS. 9 and 10. In this embodiment, walls corresponding to walls 14 of the first embodiment are not provided. Instead, plates 21 are interposed between water chambers 18 and the respective conduits 19. Each said plate 21 is located equi-distant to conduit 19 and chamber 18 and is positioned to receive water from water feed means 17, as clearly shown in the drawing. Each said plate 21 extends vertically and also parallel to the lateral surfaces of chambers 18. Each said plate 21 is corrugated, with its corrugations extending vertically. The result is to permit the use of more water feed means 17, since such water feed means on the respective facing lateral walls of conduit 19 and chambers 18 may oppose each other, since their water films impinge upon the blocking plates 21. The water which strikes the plate 21 then drops downwardly toward the direction of the bottom sump 29 and does not interfere with the water film surfaces below it.

The flow of water into the sump 29 is controlled by deflection plates 22 of which there are two located below the level of the water feed means and downwardly inwardly inclined in the manner shown in FIG. 9. A plate 26 underlies and extends beyond the space between plates 22. Said plate 26 is perforated, so as to permit the water to drop through the plate and into the sump.

As a further important optional feature of the invention, means are provided to make certain that any water trickling down onto the sump plate 26 will be heated to saturation temperature. The lower portions of the outer walls of chambers 18 are inclined, as indicated by reference numerals 18a, to provide a space between the wall portions 18a, at the bottom thereof, and the outer wall of the casing of condenser 16a.

While we have disclosed preferred embodiments of our invention, and have indicated various changes, omissions and additions which may be made therein, it will be apparent that various other changes, omissions and additions may be made in the invention without departing from the scope and spirit thereof.

We claim:

1. Apparatus for condensing steam comprising a generally rectangular chamber having a longitudinal axis, a vertical and longitudinal side wall, a further vertical and longitudinal wall spaced from, parallel to, opposing and coextensive with said side wall, said chamber having a top opening through which steam can be forced transversely downwardly between said walls to be condensed, and a sump having an outlet conduit below said walls through which the condensate can flow out of the chamber, and steam condensing means comprising longitudinally successive means in said side wall and spacedly disposed along the entire length thereof injecting cooling water into said chamber in each instance in the form of a generally planar vertical film transversely to said longitudinal axis and propelled so as to strike said further wall.

2. Apparatus in accordance with claim 1, said further vertical wall also being a side wall, said steam condensing means further comprising further longitudinally successive means in said further wall and spacedly disposed along the entire length thereof in longitudinal alternation with the first mentioned injection means and injecting cooling water into said chamber in each instance in the form of a generally planar vertical and transverse film propelled so as to strike said first mentioned side wall.

3. Apparatus for condensing steam comprising: a generally rectangular chamber having a longitudinal axis, vertical longitudinal side walls, a further vertical longitudinal wall spaced from, parallel to, opposing and coextensive with said side walls, said chamber having a top opening through which steam can be forced transversely between said side walls on either side of said further wall to be condensed, and a sump having an outlet conduit below said side walls through which the condensate can flow out of the chamber; and steam condensing means comprising longitudinally successive means in each said side wall and spacedly disposed along the entire length thereof injecting cooling water into said chamber in each instance in the form of a generally planar vertical film extending transversely to said longitudinal axis and propelled so as to strike said further wall.

4. Apparatus according to claim 3, said further wall being corrugated with the corrugations extending vertically.

References Cited in the file of this patent

UNITED STATES PATENTS

| | | |
|---|---|---|
| 1,270,552 | Ross | June 25, 1918 |
| 1,438,200 | Wallem | Dec. 12, 1922 |
| 1,511,749 | Powell | Oct. 14, 1924 |
| 1,868,632 | Edge | July 26, 1932 |
| 2,421,761 | Rowland et al. | June 10, 1947 |
| 2,573,491 | Richardson | Oct. 30, 1951 |

FOREIGN PATENTS

| | | |
|---|---|---|
| 148,450 | Germany | Mar. 5, 1904 |